US008968500B2

(12) United States Patent
Niermann et al.

(10) Patent No.: US 8,968,500 B2
(45) Date of Patent: Mar. 3, 2015

(54) METHOD AND DEVICE FOR ADHESIVELY JOINING LARGE-SURFACE COMPONENTS IN VEHICLE CONSTRUCTION

(75) Inventors: Dirk Niermann, Lillenthal (DE); Holger Frauen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/221,279

(22) Filed: Aug. 30, 2011

(65) Prior Publication Data

US 2012/0043008 A1 Feb. 23, 2012

(30) Foreign Application Priority Data

Mar. 19, 2009 (DE) .................. 10 2009 013 540
Mar. 8, 2010 (DE) .................. 10 2010 010 686

(51) Int. Cl.
*B32B 41/00* (2006.01)
*B64F 5/00* (2006.01)
(Continued)

(52) U.S. Cl.
CPC ........... *B64F 5/0009* (2013.01); *B05C 11/1021* (2013.01); *B64C 1/068* (2013.01); *B05C 5/0216* (2013.01); *B05C 13/02* (2013.01); *B62D 27/026* (2013.01); *B62D 65/028* (2013.01)
USPC ................. 156/64; 156/94; 156/98; 156/286; 156/350; 156/351; 156/358; 156/360; 156/367; 156/378; 156/379; 244/117 R; 244/119; 244/131; 244/132

(58) Field of Classification Search
USPC ............... 156/64, 94, 98, 286, 350, 351, 358, 156/360, 367, 378, 379; 244/117 R, 119, 244/131, 132
See application file for complete search history.

(56) References Cited

U.S. PATENT DOCUMENTS 5,738,749 A * 4/1998 Grimshaw et al. ............. 156/312
6,017,484 A * 1/2000 Hale .............................. 264/510
(Continued)

FOREIGN PATENT DOCUMENTS

CN 1826451 8/2006
CN 101272956 9/2008
(Continued)

OTHER PUBLICATIONS

Non-Final Office Action for U.S. Appl. No. 13/231,224 dated Mar. 14, 2012.
(Continued)

*Primary Examiner* — Jeff Aftergut
*Assistant Examiner* — Joshel Rivera
(74) *Attorney, Agent, or Firm* — Jenkins, Wilson, Taylor & Hunt, P.A.

(57) ABSTRACT

A method for joining, by adhesive bonding, at least two large joining partners in vehicle construction, in particular in aircraft construction, comprises the following steps:
  detecting the geometric data of the joining partners in an automated manner,
  detecting the joint gap dimensions of the joining partners from the geometric data,
  applying adhesive to one or both joint faces of the two joining partners to be joined as a function of the joint gap dimensions,
  joining the joining partners in the joining position, and
  sequentially applying joining pressure to the joint faces along the joint gap to bring the joining partners into the final joining position.

11 Claims, 4 Drawing Sheets

(51) Int. Cl.
*B05C 11/10* (2006.01)
*B64C 1/06* (2006.01)
B05C 5/02 (2006.01)
B05C 13/02 (2006.01)
B62D 27/02 (2006.01)
B62D 65/02 (2006.01)

(56) References Cited

U.S. PATENT DOCUMENTS

| | | | |
|---|---|---|---|
| 7,279,056 B2 | 10/2007 | Weisser | |
| 7,410,352 B2 * | 8/2008 | Sarh | 425/317 |
| 7,909,952 B2 | 3/2011 | Kato | |
| 8,515,424 B2 | 8/2013 | Tinnakornsrisuphap et al. | |
| 2004/0236454 A1 * | 11/2004 | Weisser | 700/123 |
| 2005/0039843 A1 | 2/2005 | Johnson et al. | |
| 2005/0247396 A1 * | 11/2005 | Oldani et al. | 156/173 |
| 2006/0108058 A1 * | 5/2006 | Chapman et al. | 156/245 |
| 2007/0034197 A1 | 2/2007 | Tschech | |
| 2007/0241478 A1 | 10/2007 | Buckley | |
| 2008/0230652 A1 * | 9/2008 | Biornstad et al. | 244/120 |
| 2008/0256788 A1 | 10/2008 | Glazebrook | |
| 2009/0151852 A1 * | 6/2009 | Roebroeks | 156/64 |
| 2009/0154775 A1 | 6/2009 | Lea et al. | |
| 2011/0142663 A1 | 6/2011 | Gill | |
| 2011/0277935 A1 | 11/2011 | Borgmann et al. | |
| 2012/0043009 A1 | 2/2012 | Niermann et al. | |

FOREIGN PATENT DOCUMENTS

| | | |
|---|---|---|
| DE | 10 2007 061429 A1 | 7/2009 |
| EP | 1004361 A2 | 5/2000 |
| FR | 2912680 | 8/2008 |
| JP | 58-187479 | 11/1983 |
| JP | 2003-513821 | 4/2003 |
| JP | 2004-331054 | 11/2004 |
| JP | 2008-502217 | 1/2008 |
| JP | 2008-143480 | 6/2008 |
| JP | 2009-508755 | 3/2009 |
| JP | 2010-519120 | 6/2010 |
| RU | 2329183 | 7/2008 |
| SU | 137015 | 5/1960 |
| WO | WO 01/34381 | 5/2001 |
| WO | WO 2004/076769 | 9/2004 |
| WO | WO 2005/119990 | 12/2005 |
| WO | WO 2007/034197 | 3/2007 |
| WO | WO 2008/129156 | 10/2008 |
| WO | WO 2010/014333 | 2/2010 |
| WO | WO 2010/106123 A | 9/2010 |
| WO | WO 2010/106129 A1 | 9/2010 |

OTHER PUBLICATIONS

International Search Report and Written Opinion dated May 19, 2010 for PCT/EP2010/053523 (WO2010/106129).
International Search Report and Written Opinion dated May 20, 2010 for PCT/EP2010/053512 (WO 2010/106123 A).
Chinese Office Action for Application No. 201080012438.1 dated Dec. 5, 2012.
Japanese Office Action for Application No. 2012-500252 dated Mar. 8, 2013.
Advisory Action for U.S. Appl. No. 13/231,224 dated Oct. 31, 2012.
Russian Decision to Grant for Application No. 2011139569/11 dated Nov. 21, 2012.
Japanese Office Action for Application No. JP 2012-500250 dated Dec. 3, 2012.
Non-Final Office Action for U.S. Appl. No. 13/231,224 dated Jan. 3, 2013.
Final Office Action for U.S. Appl. No. 13/231,224 dated Sep. 21, 2012.
Final Office Action for U.S. Appl. No. 13/231,224 dated Jun. 7, 2013.
Japanese Notice of Allowance for Application No. 2012-500250 dated Aug. 28, 2013.
Non-Final Office Action for U.S. Appl. No. 13/231,224 dated Dec. 27, 2014.
Non-Final Office Action for U.S. Appl. No. 13/231,224 dated Jul. 22, 2014.

* cited by examiner

METHOD AND DEVICE FOR ADHESIVELY JOINING LARGE-SURFACE COMPONENTS IN VEHICLE CONSTRUCTION

CROSS-REFERENCE TO RELATED APPLICATIONS

This application is a continuation of and claims priority to PCT/EP2010/053523 filed Mar. 18, 2010 which claims the benefit of and priority to German Patent Application No. 10 2009 013 540.5 filed Mar. 19, 2009 and German Patent Application No. 10 2010 010 686 filed Mar. 8, 2010, the entire disclosures of which are herein incorporated by reference.

FIELD OF THE INVENTION

The invention relates to a method for joining, by adhesive bonding, large components in vehicle construction, in particular in the construction of aircraft fuselages for large aircraft.

In recent years, modern lightweight constructions have significantly changed vehicle construction, whether of ships, aircraft, cars or railway vehicles. Thus, the use of suitable materials leads to improvements in terms of weight, safety and comfort, with cost savings also being possible at the same time. In addition to the use of suitable materials, this progress has been achieved through the intelligent use of modern adhesive technology, it being possible to combine the adhesive technology with the conventional joining technologies such as riveting, screwing or spot welding.

Meanwhile, the adhesive technology has also found its way into aircraft construction. Thus, the fuselage of large aircraft is joined substantially manually in a shell construction. In correspondingly large devices, the fuselage of an aircraft is equipped with stringers, formers, passenger and cargo floors, door and freight door frames and window frames in partially mechanised and in part in manual assembly steps, before the outer skin is closed. In this case the fuselage, which consists of CFRP, light metal alloys and/or Glare®, consists of a barrel-shaped segment or of partial shells.

Structural connections are joined by riveting or by a combination of riveting and adhesive bonding, also referred to as rivet-bonding. Panels and fuselage segments and the inserted components are interconnected by riveting, liquid shim materials which fill the slightly irregular gap remaining between the joining parts during riveting being applied before joining. The shim materials are generally two-component epoxy resins which have a gap-filling capacity of approximately 2-3 mm and a curing time of 8 h at room temperature.

Larger gaps are compensated manually in a time-consuming manner by means of solid shim made of fibre composite material. A combination of liquid and solid shim materials can also be used. As a whole, the processing of the shim materials is carried out substantially manually and is very time-consuming, in particular since the joining partners are temporarily joined to determine the gap dimensions and the joining partners must then be moved apart from one another again.

An example of the construction of large aircraft in shell construction can be derived from DE 10 2007 061 429 A1, from which a fuselage structure of an aircraft is known. In this case, the fuselage structure comprises an outer skin, structural components such as stringers and formers which are connected to the outer skin, and an inner lining. The structural components are adhesively bonded, riveted and/or welded to the outer skin, and the inner lining and the outer skin and the structural components thereof together form a carrying connection. In this case, the inner lining can also be connected to the structural components and/or the outer skin by means of an adhesive joint.

The adhesion systems and adhesion technologies which have so far been used in the aviation field do not allow rapid, automated joining by adhesion of the fuselage and fitted components. Furthermore, automated pressing of the components to be adhesively bonded is difficult to control in the case of large joint faces, since very high joining forces would be required for pressing and ensuring complete wetting of the joint faces of the joining partners.

SUMMARY OF THE INVENTION

The object of the invention is therefore to provide a method and a corresponding device for automated joining, by adhesive bonding, of large components in vehicle construction, in particular in aircraft construction.

This object is achieved by a method with the features of claim 1 and/or by a device with the features of claim 10. Preferred embodiments of the invention are the subject-matter of the dependent claims.

The method according to the invention for joining, by adhesive bonding, at least two large joining partners in vehicle construction, in particular in aircraft construction, comprises the following steps:

- detecting the geometric data of the joining partners in an automated manner,
- detecting the joint gap dimensions of the joining partners from the geometric data,
- applying adhesive to one or both joint faces of the two joining partners to be joined as a function of the joint gap dimensions,
- joining the joining partners in the joining position thereof, and
- sequentially applying joining pressure to the joint faces along the joint gap to bring the joining partners into the final joining position.

The sequential application of the joining pressure preferably takes place in a predetermined region which is shifted along the joint gap of corresponding joining partners, the joining partners being brought into the final joining position by the joining pressure in the predetermined region.

More preferably, the position of the predetermined region in which the sequential pressure is applied is shifted continuously along the joint gap.

In a further preferred embodiment of the invention, the position of the predetermined region in which the sequential pressure is applied is shifted piecewise along the joint gap. In other words, the sequential pressure is applied discontinuously in a predetermined cycle.

In aircraft construction, the joining partners, such as fuselage elements and fuselage segments, and the components to be fitted are subject to tolerances. The geometries of the joining partners can be detected by modern measuring methods and the gap dimensions for adhesive joining can be determined from the detected digital data with sufficient accuracy. Applying the adhesive in the joint gap after or during joining of the joining partners makes it possible to join the joining partners in an automated manner. Further, since temporary joining of the joining partners for determining the gap dimensions is omitted, a high production rate is possible.

The amount of adhesive to be applied is preferably determined on the basis of the joint gap dimensions. It is thus ensured that the adhesive joint is sufficient for the desired stability conditions and that adhesive is used economically.

The adhesive can be applied in a region of the joint gap which is located directly in front of the predetermined region of the joint gap which is to be joined by sequential pressure. However the adhesive can also be applied at a time before the joining partners are joined.

The flow required for this purpose of the adhesive can be achieved by means of its composition, gravitational force, centrifugal force, magnetic and/or electrical fields, low pressure in the joint, temperature control of the joining partners and/or the adhesive or a combination of the mentioned parameters.

More preferably, the joint gap can comprise lateral or surface-edge limiting elements in order to prevent the adhesive applied in the joint gap from escaping. As a result, uncontrolled leakage of adhesive from the bonding gap is avoided. These limiting elements can remain at the bonded joint after curing or can be removed once a sufficient mechanical stability of the bonded joint has been reached. In the case that the elements remain, they can consist of a second adhesive. This second adhesive can be applied to one or both of the adherend surfaces at a time before, while or after the joining partners are brought into the final joining position. This second adhesive can be cured together with the adhesive applied in the joint gap or separately therefrom. In the case that the limiting elements are removed, they can comprise a non-adhesive surface, which for example can be obtained by means of the material used or a laminated film.

Before the joining partners are joined together, the joint faces of the joint gaps or joints are preferably subjected to an automated pretreatment to optimise the quality in terms of adhesion and the quality thereof in terms of adhesion is determined. An optimum bonding result is thus achieved.

In particular, in aircraft construction the joining partners are formed by fuselage segments and structural components such as formers, stringers, etc. for constructing a fuselage structure.

The device according to the invention for carrying out the above-described method comprises:
- a component carrier comprising a component seat for receiving a first joining partner,
- a central carrier for receiving at least an integration tool,
- an integration tool for receiving and introducing the further joining partner to be introduced into the first joining partner,
- a measuring system for detecting the geometric data of the joining partners and for calculating the joint gaps,
- at least a modular tool for applying the adhesive,
- at least a pressure tool for applying the joining pressure along the joint gap to be adhesively bonded,
- a control system for controlling the device.

The pressure tool can preferably apply the joining pressure to the joint gap sequentially on one side or on each side.

More preferably, the device comprises further tools for surface treatment and/or for surface monitoring and/or for curing the adhesive. In this case, individual tools can be used for processing the components to be fitted, while further tools are designed to be received on the central carrier, in order to be able to process and/or measure the first joining partner arranged on the component carrier. These tools can be designed as robots which, according to requirements, have corresponding spatial degrees of freedom.

BRIEF DESCRIPTION OF THE DRAWINGS

A preferred embodiment of the invention will be described below with reference to the drawings, in which.

DESCRIPTION OF EXEMPLARY EMBODIMENTS

Figure 1:
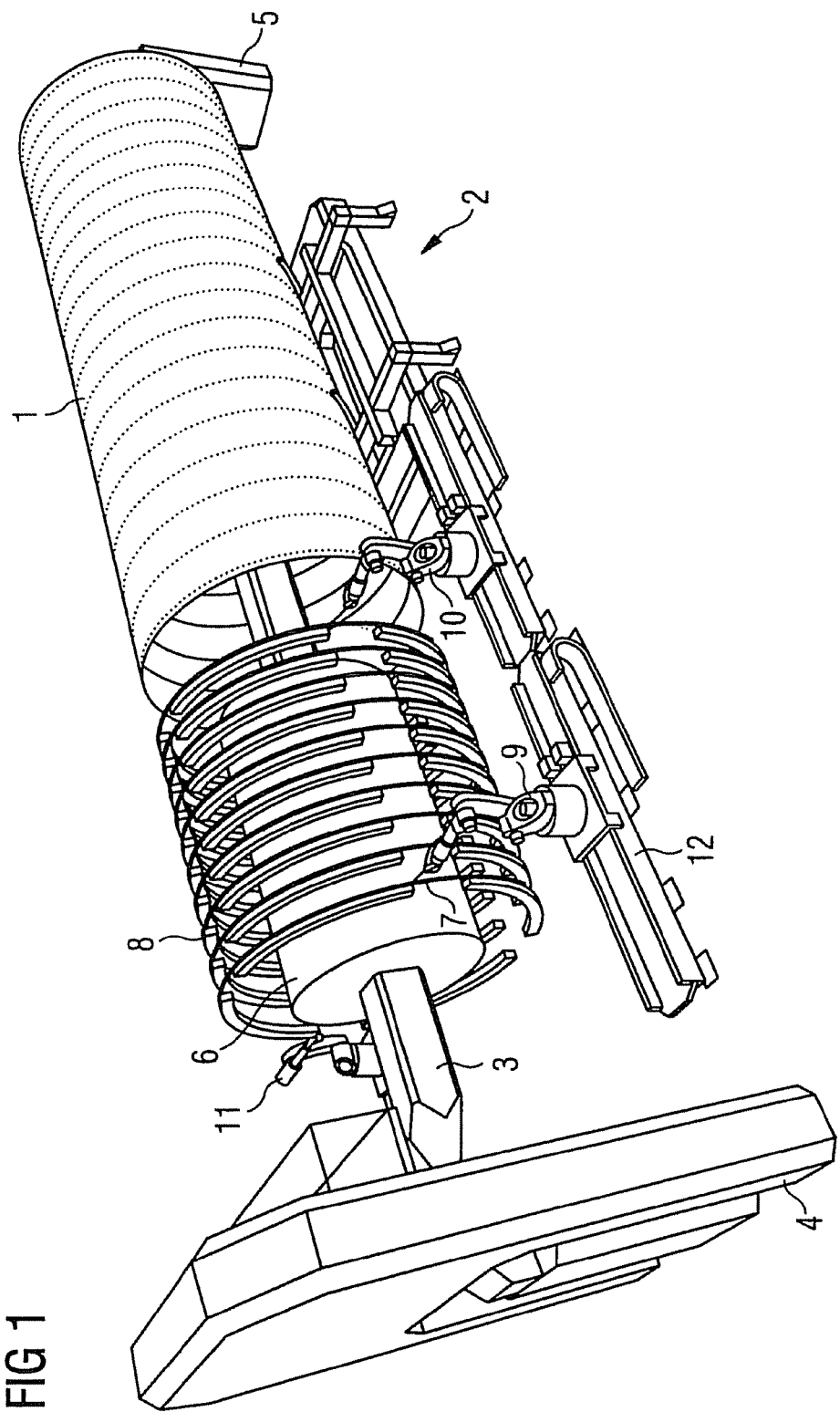
FIG. 1 is a first perspective view of the device according to the invention comprising a tool for fitting formers which is guided via a central carrier.

FIG. 1 is a schematic view of the device according to the invention for the structural completion of fuselage segments based on the central carrier principle, the device holding ready technologies and systems for largely parallelised fitting of formers, passenger and cargo floors, door and freight door frames and window frames in the fitted fuselage segment. A fuselage segment 1 is mounted on a movable component carrier 2, the component carrier 2 comprising an automated component seat and systems for correcting shape and position (not shown). A central carrier 3, which is supported on each side by rigid and lowerable supports 4, 5, extends inside the fuselage segment 1 when the fuselage segment 1 is in the fitted state.

Depending on the fitting operation, different integration tools 6 are guided on the central carrier 3, which is supported by the rigid and lowerable supports 4, 5 and can for example have a length of approximately 22 m. The central carrier 3 can be retracted telescopically to bring the barrel-shaped fuselage segment 1 shown in FIG. 1 into the device. The fuselage segment 1 is brought into the device lying on the movable component carrier 2. The component carrier 2 has a functionality for correcting the position of the fuselage segment 1 and tensioning devices with which the shape of the fuselage segment 1 can be fixed and optionally corrected. Once the fuselage segment 1 has been introduced, the central carrier 3 can be moved back out to the rear support 5. The respectively required integration tool 6, which is already prefitted outside the system and in the example is equipped with formers 7 to be fitted, is then mounted.

In order to achieve a high level of parallelisation of assembly steps, as many of the above-mentioned components as possible per process step and per tool are to be fitted simultaneously.

The integration tool 6 equipped with the components to be introduced is moved into the fuselage segment 1 via the central carrier 3 as a guide means and orientates itself optically in space, in such a way that the former flange surface 8 later represents the zero reference point.

The components to be fitted, in this case the formers 7, are then brought simultaneously into their precise joining positions by folding, placing or radial expansion processes of the integration tool 6. A possible combination is for example the simultaneous introduction of formers 7 and floor (not shown).

The device further comprises modular tools 9, 10, 11, known as end effectors, which are movably arranged on a rail system 12, are used for surface treatment, surface monitoring, adhesive application and for curing the adhesive and for these tasks can be equipped with the corresponding tools, the corresponding equipment taking place automatically.

Figure 2:
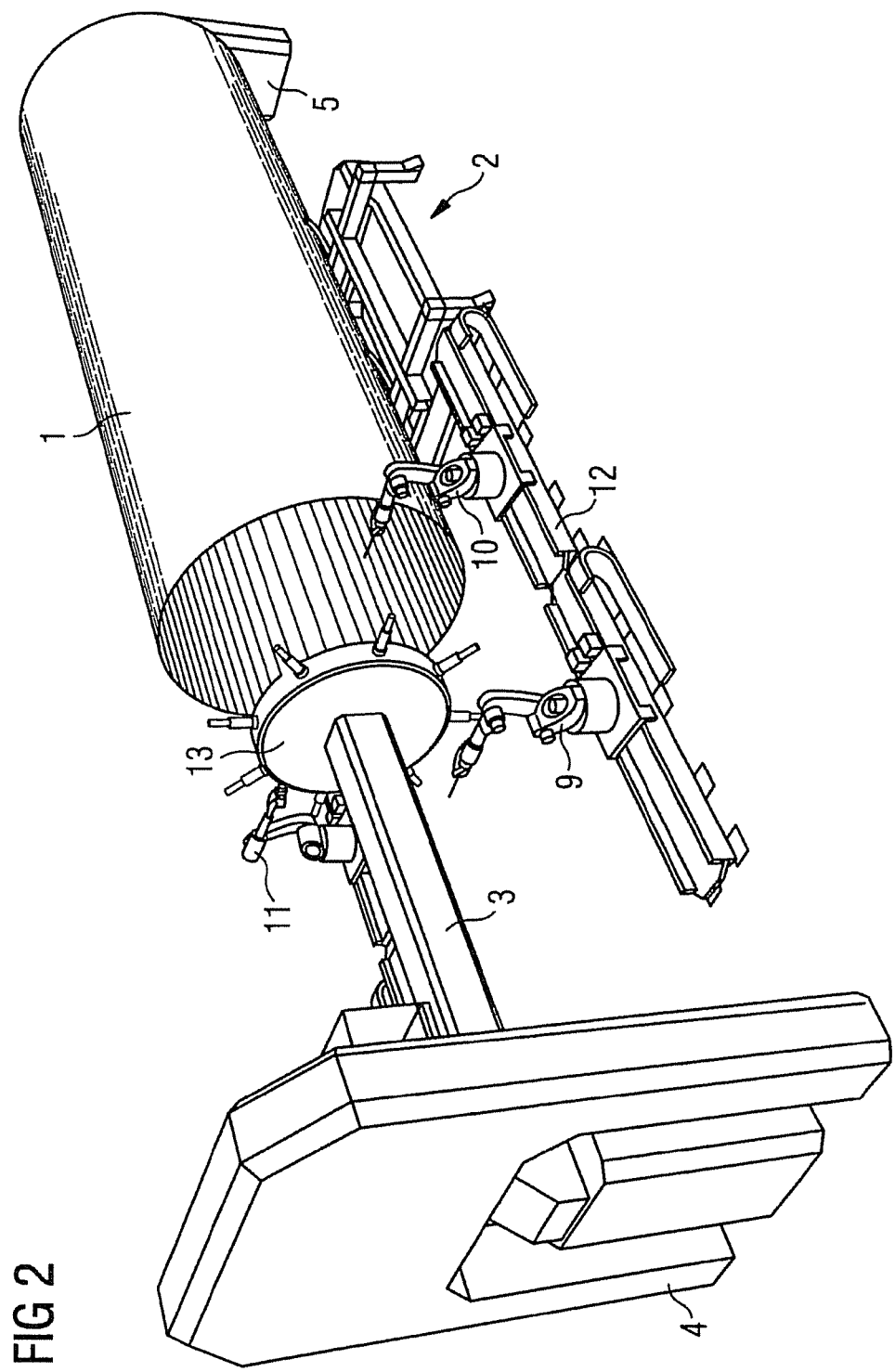
FIG. 2 is a second perspective view of the device comprising a further tool.

FIG. 2 shows the device of FIG. 1, a modular tool 13 being arranged on the central carrier 3, which tool is used to treat the joint faces in the fuselage segment 1 automatically to achieve an optimum bonding result. The modular tool 13 is also used to assess the pretreated joint faces with regard to the quality thereof in terms of adhesion. The modular tool 13 is moved into the fuselage segment 1 to pretreat and assess the joint faces.

As explained above, the approach in terms of joining is based on the use of adhesive bonding technology, without additional riveting being used for fixing. Should rivets be required at selected points, these are introduced later in another system. The function of the adhesive bonding during assembly is thus to fix the introduced components rapidly and compensate tolerances on the inner surface of the fuselage, which depending on the production technology may be subject to tolerances of varying strengths.

In addition to the fulfillment of a compensating and sealing function, the basic requirements placed on a CFRP structural adhesive for aviation applications include good processability, which in particular is defined by long open times and assembly-compatible rheology, rapid curing and high pressure resistance, in order to avoid loosening in the cured joint owing to flow processes.

Therefore, the joint faces in the fuselage and on the components such as the exemplary formers are firstly pretreated automatically, in this case by the tool 13, and then tested by an automated monitoring method with regard to the quality thereof in terms of adhesion. As a result, the required pretreatment time is considerably reduced with substantially improved reproducibility in comparison to manual execution.

Figure 3:
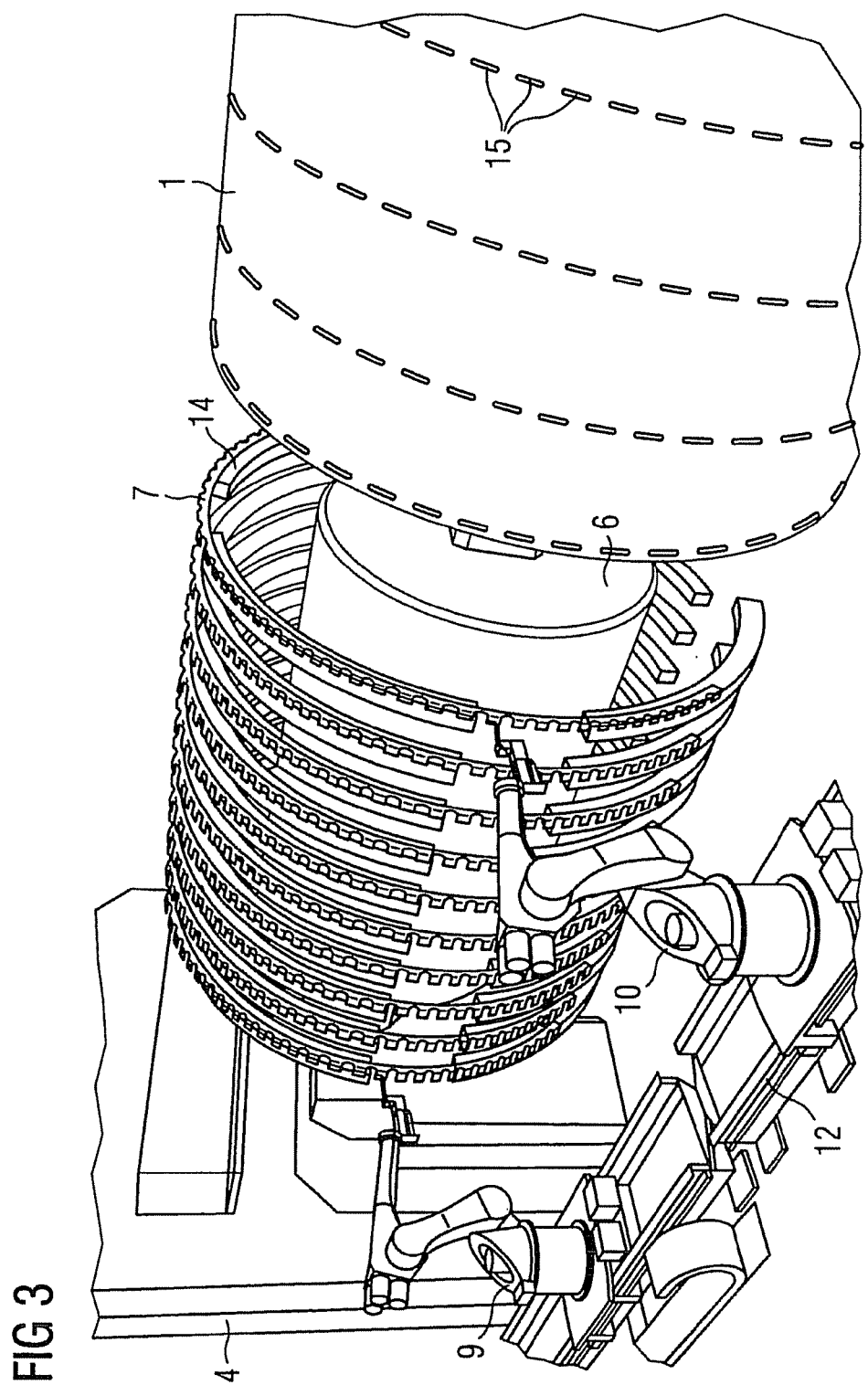
FIG. 3 is a view of a detail of the device according to FIG. 1.

FIG. 3 shows the process of the preparatory surface treatment of the formers 7 by means of the modular tools 9 and 10. In this case, the formers 7 are arranged on schematically shown receivers 14. After the preparatory surface treatment, the integration tool 6 together with the fitted formers is brought into the fuselage structure 1 and the formers 7 are brought automatically into the joining position by means of the receiver 14 of the integration tool 6. The adhesive is then introduced into the respective joint gaps through application openings 15 arranged in the fuselage structure.

Figure 4:
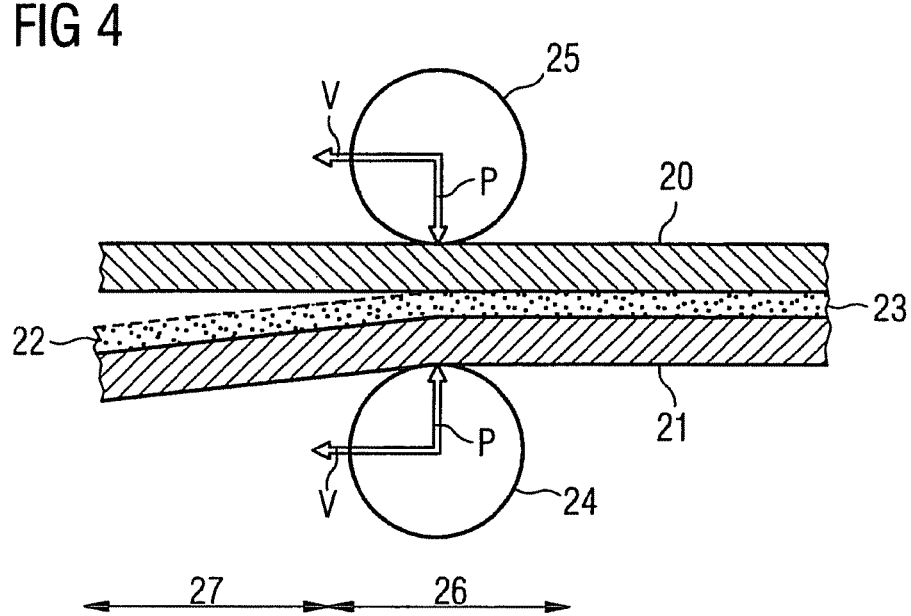
FIG. 4 is a schematic view of the continuous sequential application of a joining pressure.

FIG. 4 is a schematic cross-sectional view of the process of continuous joining with sequential pressurisation. A first, outer joining partner 20 and a second, inner joining partner 21 are shown. The outer joining partner 20 can for example be a fuselage segment in which a former is to be introduced as an inner joining partner 21. The two joining partners are brought into a temporary joining position (not shown) by corresponding tools of the device, i.e. the component carrier 1 and the integration tool 6 described in the preceding figures, i.e. the receivers 14 thereof. After a preparatory treatment and inspection of the joint faces, the required adhesive 22 is applied. In FIG. 4, the adhesive 22 is applied only to the inner joining partner 21, but this is not obligatory. The adhesive 22 can be applied to the two joining partners 20, 21 or only to one, depending on the application. An inner pressure tool 24 and an outer pressure tool 25 are shown, which exert a predetermined pressure P on to the outer joining partner 20 and inner joining partner 21 within a joint region 26, which results in a joint gap 23 of a predetermined thickness. The outer and inner pressure tools 20, 21 are moved at a predetermined speed V along the joint gap 23, in such a way that continuous sequential joining of the joining partners 20, 21 results. The adhesive 22 can be introduced in a region 27 directly in front of the current joint region 26, or else the adhesive 22 can be introduced before joining of the joining partners in the temporary joining position. In other words, on the basis of the example of FIGS. 1 to 3, the adhesive 22 can be applied to the joint faces of the formers 7 before the integration tool 6 with the fitted formers 7 is moved into the fuselage segment 1. In this case, the inner pressure tool can be a component of the receivers 14 of the integration tool 6, while the outer pressure tool 25 can be an exchangeable tool of the modular tools 9, 10, 11 designed as a robot. As a result of the pressure being applied sequentially and thus locally, the required high pressure can be provided locally and does not need to be provided over the entire joint gap simultaneously, which is hardly expedient technically in the case of the large components.

Figure 5:
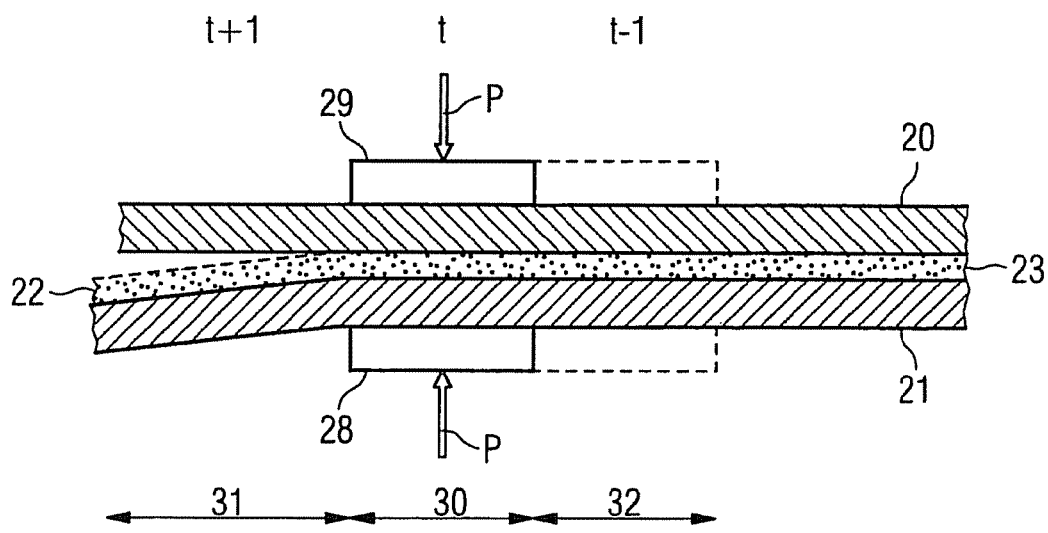
FIG. 5 is a schematic view of the piecewise sequential application of a joining pressure.

FIG. 5 is a schematic cross-sectional view of the process of joining with sequential pressurisation in pieces or portions, i.e. discontinuously. An outer joining partner 20 and an inner joining partner are joined together by means of an adhesive 22 in such a way a joint gap 23 of predetermined thickness is formed. In this case, the sequential pressurisation for joining the joining partners takes place in cycles using an inner and an outer pressure tool 28, 29. In other words, at a time t a pressure P is exerted on the joining partners in the current joint region 30 and the joining partners 20, 21 are brought into the final joining position. Dashed lines show the pressure tools at the previous time t−1, where they joined the joining partners 20, 21 in the preceding joint region 32. At the next time t+1, the pressure tools are brought along the joint gap 23 into the next joint region 31 and then join the joining partners 20, 21 therein. In other words, the pressure tools are removed from the current pressure region 30 on each side and brought into the next joint region 31 where the next joining operation is carried out by means of pressurisation.

At the current time t, the next joint region 31 can be used as a region in which the adhesive 22 is introduced. However, this is not obligatory, but rather the adhesive 22 can also be applied at a time before the introduction of the formers 7 into the fuselage segment 1, as in the description of FIG. 4.

In the described exemplary methods for sequential pressurisation it is possible for the pressure to be applied from only one side. If, for example, the outer joining partner 20 has a sufficient strength, the pressurisation can take place by means of only an inner pressure tool either continuously or in portions.

LIST OF REFERENCE NUMERALS 1 fuselage segment
2 component carrier
3 central carrier
4 front support
5 rear support
6 integration tool
7 formers
8 former flange surface
9 modular tool
10 modular tool
11 modular tool
12 rail system
13 modular tool
14 receiver
15 application opening
20 first joining partner
21 second joining partner
22 adhesive
23 joint gap
24 inner pressure tool
25 outer pressure tool
26 joint region
27 region in front of the joint region
28 inner pressure tool
29 outer pressure tool
30 joint region 31 next joint region
32 previous joint region
P pressure
V speed along the joint gap
t time

The invention claimed is:

1. A method for joining, by adhesive bonding, at least two large outer and inner joining partners in aircraft construction, wherein the outer joining partner is a fuselage segment and the inner joining partner is a structural component, the method comprising:
   providing a central carrier comprising an integration tool and equipping the integration tool with the structural component to be fitted,
   providing a component carrier and mounting the fuselage segment on the component carrier, wherein the integration tool and the structural component are movable in the fuselage segment,
   providing modular tools for surface monitoring and adhesive application and which are arranged outside of the fuselage segment and are movable along the fuselage segment,
   detecting the geometric data of the fuselage segment and the structural component in an automated manner,
   detecting the joint gap dimensions of the fuselage segment and the structural component from the geometric data,
   applying a flowable adhesive by at least one of the modular tools to one or both joint faces of the fuselage segment and the structural component to be joined as a function of the joint gap dimensions,
   joining the fuselage segment and the structural component in a joining position, and
   sequentially applying joining pressure to the joint faces along the joint gap to bring the fuselage segment and the structural component into the final joining position, wherein the joining pressure is applied to the joint gap on each side by an inner pressure tool and an outer pressure tool, and wherein the outer pressure tool is an exchangeable tool of at least one of the modular tools.

2. The method according to claim 1, wherein the sequential application of the joining pressure takes place in a predetermined region which is shifted along the joint gap of corresponding joining partners, the joining partners being brought into the final joining position by the joining pressure in the predetermined region.

3. The method according to claim 2, wherein the position of the predetermined region in which the sequential pressure is applied is shifted continuously along the joint gap.

4. The method according to claim 2, wherein the position of the predetermined region in which the sequential pressure is applied is shifted piecewise along the joint gap.

5. The method according to claim 1, wherein the amount of the flowable adhesive to be applied is determined on the basis of the joint gap dimensions.

6. The method according to claim 1, wherein the flowable adhesive is applied in a region of the joint gap which is located directly in front of the predetermined region of the joint gap which is to be joined by sequential pressure.

7. The method according to claim 1, wherein the joint gap comprises lateral or surface-edge limiting elements in order to prevent the flowable adhesive applied in the joint gap from escaping.

8. The method according to claim 1, wherein before the joining partners are joined together, the joint faces of the joint gaps are subjected to an automated pretreatment to optimise the quality in terms of adhesion and the quality thereof in terms of adhesion is determined.

9. The method according to claim 1, wherein the joining partners are formed by fuselage segments and structural components for constructing a fuselage structure.

10. The method according to claim 1, wherein the flowable adhesive is introduced into the joint gap through at least one application opening arranged in one of the joining partners.

11. The method according to claim 1, wherein the structural component is a former, a stringer, a passenger floor, a cargo floor, a door frame, a freight door frame, or a window frame.

* * * * *

UNITED STATES PATENT AND TRADEMARK OFFICE
CERTIFICATE OF CORRECTION

| | | |
|---|---|---|
| PATENT NO. | : 8,968,500 B2 | Page 1 of 1 |
| APPLICATION NO. | : 13/221279 | |
| DATED | : March 3, 2015 | |
| INVENTOR(S) | : Dirk Niermann et al. | |

It is certified that error appears in the above-identified patent and that said Letters Patent is hereby corrected as shown below:

On title page, item 63 should be inserted as follows under "Related U.S. Application Data":

-- (63) Continuation of application No. PCT/EP2010/053523 filed on March 18, 2010. --

Signed and Sealed this
Seventh Day of July, 2015

Michelle K. Lee
*Director of the United States Patent and Trademark Office*